(12) United States Patent
Haimer

(10) Patent No.: US 10,773,314 B2
(45) Date of Patent: Sep. 15, 2020

(54) ADAPTER FOR HOLDING A TOOL IN A COLLET CHUCK

(71) Applicant: Franz Haimer Maschinenbau KG, Igenhausen (DE)

(72) Inventor: Franz Haimer, Igenhausen (DE)

(73) Assignee: FRANZ HAIMER MASCHINENBAU KG, Igenhausen (DE)

(*) Notice: Subject to any disclaimer, the term of this patent is extended or adjusted under 35 U.S.C. 154(b) by 5 days.

(21) Appl. No.: 16/117,595

(22) Filed: Aug. 30, 2018

(65) Prior Publication Data

US 2019/0070672 A1    Mar. 7, 2019

(30) Foreign Application Priority Data

Sep. 4, 2017   (DE) .................. 10 2017 120 235

(51) Int. Cl.
| | | |
|---|---|---|
| *B23B 31/20* | (2006.01) | |
| *B23B 31/10* | (2006.01) | |
| *B23B 31/11* | (2006.01) | |
| *B23B 31/06* | (2006.01) | |

(52) U.S. Cl.
CPC .......... *B23B 31/102* (2013.01); *B23B 31/06* (2013.01); *B23B 31/11* (2013.01); *B23B 31/207* (2013.01); *B23B 31/20* (2013.01); *B23B 2231/02* (2013.01); *B23B 2231/04* (2013.01); *B23B 2231/2024* (2013.01); *B23B 2231/24* (2013.01); *B23B 2231/46* (2013.01)

(58) Field of Classification Search
CPC ....... B23B 31/102; B23B 31/11; B23B 31/06; B23B 31/207; B23B 2231/46; B23B 2231/2024; B23B 31/20; B23B 2231/04; B23B 2231/02; B23B 2231/24; B23B 2260/026; B23B 2231/2005; B23B 2231/201; B23B 2231/2016; B23B 31/2013; Y10T 279/17504; Y10T 408/957; Y10T 279/17299; Y10T 279/17111
USPC .............................................. 279/20; 408/56
See application file for complete search history.

(56) References Cited

U.S. PATENT DOCUMENTS

| | | | | |
|---|---|---|---|---|
| 4,902,177 A | * | 2/1990 | Burnett ............... | B23B 31/1173 279/18 |
| 2016/0368064 A1 | * | 12/2016 | Boregowda ........... | B23B 31/305 |
| 2018/0200804 A1 | | 7/2018 | Haimer | |

FOREIGN PATENT DOCUMENTS

| | | |
|---|---|---|
| DE | 8717516 U1 | 1/1989 |
| DE | 102011012144 A1 | 8/2012 |
| DE | 102013100939 A1 | 7/2014 |
| DE | 102015112079 A1 | 1/2017 |
| DE | 102015214432 A1 | 2/2017 |

(Continued)

OTHER PUBLICATIONS

German Search Report for Application No. 10 2017 120 235.8 filed Sep. 4, 2017.

*Primary Examiner* — Sunil K Singh
*Assistant Examiner* — Paul M Janeski
(74) *Attorney, Agent, or Firm* — Paul D. Bianco; Gary S. Winer; Fleit Intellectual Property Law

(57) ABSTRACT

An adapter for holding a tool in a collet chuck, the adapter containing an external taper to accommodate the adapter in the collet chuck. The adapter has a thread for fastening of the tool, and several shape-mated elements are arranged on an outer surface of the external taper for non-rotational holding of the receptacle body during fastening of the tool.

18 Claims, 4 Drawing Sheets

(56) References Cited

FOREIGN PATENT DOCUMENTS

DE 102015214434 A1 2/2017
EP 2167263 A1 3/2010

\* cited by examiner

ADAPTER FOR HOLDING A TOOL IN A COLLET CHUCK

FIELD OF THE DISCLOSURE

The disclosure concerns an adapter for holding a tool in a collet chuck. The disclosure also concerns a collet chuck having such an adapter, a holding device for non-rotational holding of such an adapter during fastening of a tool and a system for such an adapter and holding device.

BACKGROUND

Collet chucks and collet receptacles are widened clamping devices for rapid and force-fit tightening of tools having high accuracy. They usually have a chuck body with an internal taper, a collet insertable into the internal taper of the chuck body and a cap nut screwed to the chuck body. The collet contains a slit receptacle with an external taper adapted to the internal taper of the chuck body and a receptacle opening adjusted to the tool shank of the tool being clamped. The collet can be pressed into the internal taper of the chuck body by tightening the cap nut and the collet compressed to clamp the tool shank. Collets are designed so that they convert the axially running force acting via the cap nut to a holding force acting across the axis of rotation and therefore acting on the tool shank via their conical shape.

Such a collet chuck together with a collet is known from DE 87 17 516 U1. For non-slip transfer of torque between the chuck and the collet during machining, the collet has a pin on its end extending into the chuck with an axially symmetric external hexagon, accommodated in shape-mated fashion by an internal hexagon of the chuck. This type of collet chuck is used for the tightening of drills, milling cutters or other machining tools having a cylindrical tool shank. The tool shank is fastened by the clamping force generated via the cap nut. Use of such a collet is only possible with a chuck specially designed for it and in tools having a sufficiently long tool shank.

SUMMARY

One aspect of the disclosure relates to a universal adapter for a collet chuck, a collet chuck for such an adapter, a holding device for such an adapter for fastening of a tool and a system for such an adapter and holding device that permits the simple mounting of tools with a fastening thread and holding them in a collet chuck.

Expedient modifications and advantageous embodiments are also disclosed.

The adapter according to the disclosure has a thread for the fastening of a tool. In contrast to a collet, the tool in the adapter according to the disclosure is not fastened by means of the collet chuck, but the adapter is inserted into the collet chuck with the already mounted tool. Several shape-mated elements for non-rotational holding of the adapter and therefore the receptacle body during mounting of the tool on the receptacle body are provided on an outer surface of the external taper. This prevents the adapter from co-rotating when a tool provided with a fastening thread is screwed into the receptacle body. The adapter can be secured free of rotation and the tool screwed into the receptacle body by applying the required torque. The adapter can then be inserted into an ordinary collet chuck instead of a collet and secured with a cap nut. Mounting is significantly simplified on this account. Because the adapter during mounting is essentially not deformed, in contrast to the collet, precise reinsertion of the adapter and therefore the tool is also possible.

In a particularly expedient embodiment, the shape-mated elements are arranged in the center of the external taper. This has the advantage that taper sections that hold the adapter in an internal taper of a collet receptacle and can center it remain above and beneath the shape-mated elements. The adapter can therefore be tightened with high accuracy and bending resistance without increasing the axial length of the adapter. The adapter can therefore be inserted in a standardized and therefore commercially available, preferably "ER" collet chuck. The shape-mated elements, however, can also be provided on the narrower end of the external taper or on another part of the external taper.

In an advantageous embodiment, the shape-mated elements can be designed in the form of several key surfaces distributed over the periphery. The key surfaces preferably have a length of $1/5$ to $1/3$ the length of the external taper in the axial direction of the adapter.

In another advantageous embodiment, a radial passage opening that discharges into an inlet on the insertion end of the external taper is situated on at least one key surface. A coolant or lubricant can be fed to a reservoir or distribution space delimited between the key surface and an internal taper of the collet receptacle via the inlet and the radial passage opening. At least one feed channel can also be arranged in the adapter to convey a coolant or lubricant supplied via the inlet and at least one passage opening to a face of the adapter on the tool side. The coolant or lubricant can be supplied to the tool in this way.

The feed channel expediently runs obliquely to the central axis of the adapter so that the coolant or lubricant can be directed toward the tip of a tool.

A distribution channel running at the level of the key surfaces can be arranged on the outer surface of the external taper. The coolant or lubricant introduced to the receptacle body can be distributed over the periphery of the adapter and supplied to several feed channels on this account.

The disclosure also concerns a collet chuck having an adapter as just described. The shape-mated elements preferably designed as key surfaces are preferably arranged so that they delimit a reservoir space with the internal taper of the chuck body of the collet chuck.

A holding device according to the disclosure for non-rotational holding of the previously described adapter is characterized by a carrier having at least one opening and holding surfaces arranged on the inside of the opening designed for shape-mated engagement with the shape-mated elements of the adapter. The adapter can be inserted into the holding device and secured against rotation in it when a tool is screwed into or onto the adapter. The adapter is prevented from rotating by the holding device and the tool provided with a fastening thread can be fastened using the required torque. The adapter can then be mounted as usual in a collet chuck.

The holding surfaces of the holding device are expediently arched inward. Linear contact between the holding surfaces and the shape-mated elements on the adapter can be achieved on this account. In a flat embodiment of the holding surfaces, only point-like contact would be produced on the outermost corners of the key surfaces in the peripheral direction. The holding surfaces can preferably be arranged on several holding pins distributed uniformly over the periphery of the opening. As an alternative, the receptacle opening of the holding device can also be formed from one piece with the inward arched holding surfaces.

Because the adapter is not deformed during mounting in the collet chuck, it preferably does not have slits or openings that extend from the outside to a through opening, apart from the openings that are provided for the coolant feed.

The adapter can preferably be designed so that the support areas for a tool with a fastening thread are arranged after fastening of the adapter with the cap nut in the collet chuck in the axial direction above the collet chuck. In an alternative form, the thread section can also be formed in the axial direction at least partially above the end of the collet chuck in the adapter on the tool side. This is made possible in that the tool is not fastened by a compression force introduced via the cap nut. The adapter has a collar that extends in the axial direction above the cap nut. Because the tool shank need not penetrate into the area of the collet chuck, a large overhang length can also be achieved with short tools.

BRIEF DESCRIPTION OF THE DRAWINGS

Additional details and advantages of the disclosure are apparent from the following description of a preferred practical example with reference to the drawings. In the drawings.

DETAILED DESCRIPTION

Figure 1:
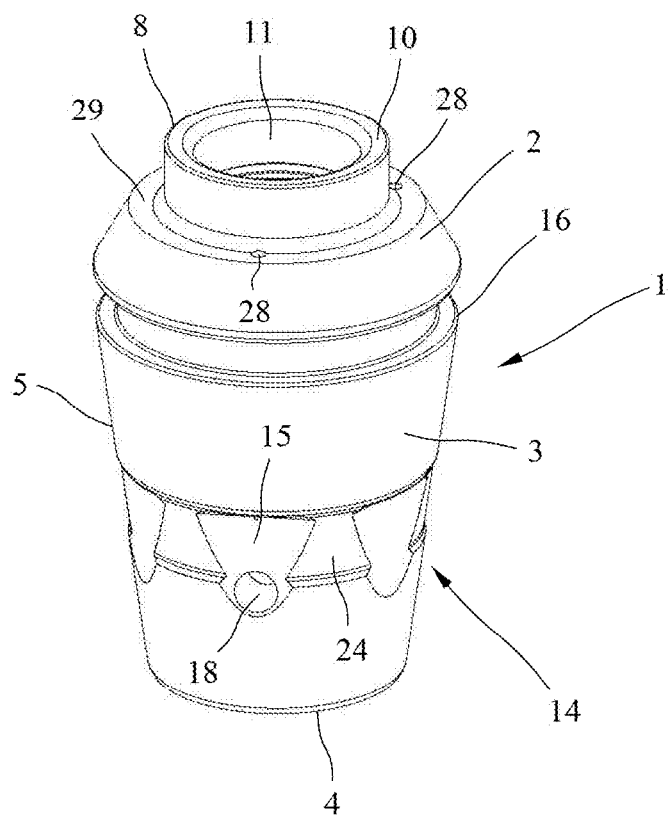
FIG. 1 shows an adapter for holding of a threaded tool in a perspective view.
Figure 2:
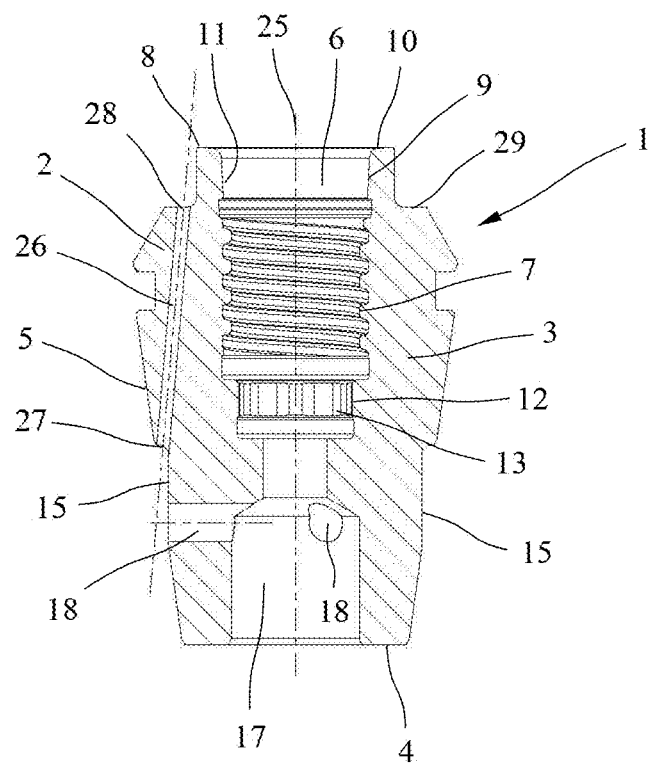
FIG. 2 shows the adapter of FIG. 1 in a longitudinal section.

An adapter 1 for clamping a tool provided with a fastening thread in a collet receptacle is depicted in FIGS. 1 and 2. The adapter 1 depicted in FIGS. 1 and 2 in a side view and longitudinal view has a rotationally symmetric receptacle element with a receptacle area 2 for the insertion of a tool and an external taper 3 to receive a known collet chuck and a corresponding internal taper of the chuck body. The external taper 3 tapering toward an insertion end 4 of the adapter contains a conical outside surface 5 adapted to the inside contour of a corresponding internal taper in the chuck body of a collet receptacle.

As follows from FIG. 2, a receptacle opening 6 with a thread designed here as an internal thread 7 is provided in the adapter 1 to hold a tool provided with a corresponding outside thread. A tool receptacle for accommodation of a threaded tool is disclosed, for example, in DE 10 2015 112 079 A1. Full reference is made to the contents of this document with reference to the features of such a tool receptacle.

Between a front face 8 of the adapter 1 on the tool side and the internal thread 7, the receptacle opening 6 has a first contact area 9 with a first conical contact surface 10 and a second conical contact surface 11 for abutment of corresponding guide surfaces on the tool. The contact surfaces 10 and 11 are directly adjacent to each other and have different taper angles. On the internal end of thread 7 a second contact area 12 is connected with several radially inward protruding web-like contact elements 13 spaced from one another in the peripheral direction. Through these contact elements 13 the tool is additionally centered and radially dampened within the receptacle opening 6.

It is apparent from FIG. 1 that several shape-mated elements 14 for non-rotational holding of the adapter 1 during fastening of a tool are provided on the conical outside surface 5 on the external taper 3 of the adapter 1. In the depicted embodiment, the shape-mated elements 14 are designed in the form of several key surfaces 15 distributed over the periphery that are arranged between the narrower insertion end 4 and a wider front end 16 of the external taper 3. The key surfaces 15 preferably arranged in the center of the external taper 3 viewed in the axial direction cooperate with the holding surfaces on a holding device to be further explained below in order to prevent rotation of the adapter when a tool is screwed in.

Placing the key surfaces 15 in the center of the external taper 3 has the advantage that conical outer surfaces running above and beneath the key surfaces 15 are still left for contact on a corresponding internal taper in the chuck body of the collet chuck. Guiding and centering of the adapter within the chuck body can be achieved on this account. However, the preferably six key surfaces 15 spaced at equal angles in the peripheral direction can also be arranged in the front or rear of the external taper 3. In an advantageous embodiment, the key surfaces 15 have a length of ⅕ to ⅓ the length of the external taper 3 when viewed in the axial direction of the receptacle body 1.

The receptacle opening 6 in the adapter 1 in the depicted embodiment is designed as a through-hole with a central entry 17 widened in diameter on the insertion end 4 of the external taper 3. Radial passage openings 18 that discharge into the entry 17 of the receptacle opening 6 are arranged in the adapter 1 in the area of the key surfaces 15. A passage opening 18 connected to the entry 17 can expediently be provided on every second key surface 15.

Figure 3:
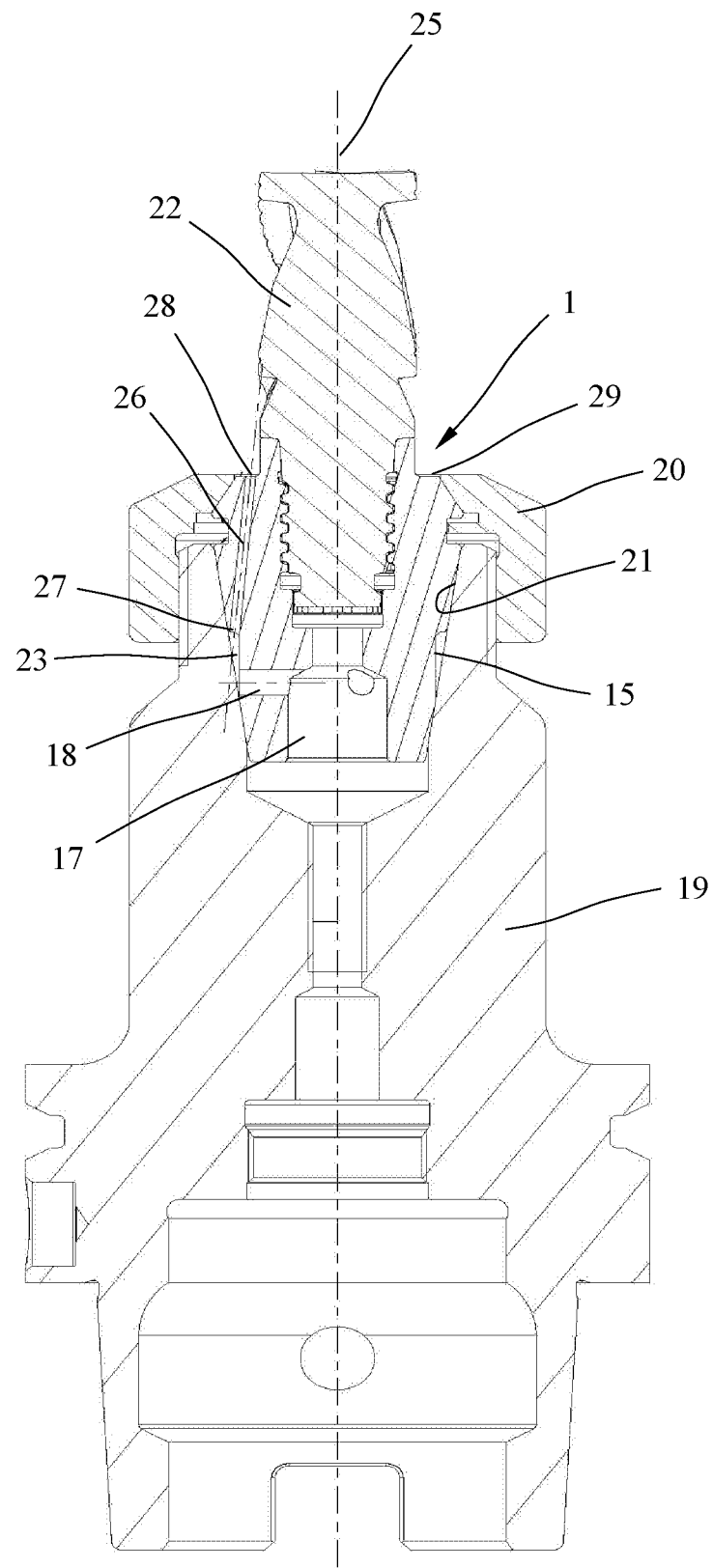
FIG. 3 shows a collet chuck having an adapter.

A collet chuck having a chuck body 19 and a cap nut 20 that can be screwed to the chuck body 19 is depicted in FIG. 3. The adapter 1 with a tool 22 screwed into it is inserted into an internal taper 21 of the chuck body 19. As follows from FIG. 3, the key surfaces 15 are designed so that a reservoir space 23 is formed in an adapter 1 inserted into the collet chuck between the key surfaces 15 and the internal taper 21 in the chuck body 19 of the collet chuck. The reservoir space 23 on the key surfaces 15 connected to holes 18 is connected to the entry 17 via the passage openings 18.

In order to produce a connection between adjacent key surfaces 15, a distribution channel 24 running at the level of the key surfaces 15 can be arranged according to FIG. 1 on the outer surface 5 of the external taper 3. The distribution channel 24 can be formed using a preferably cylindrical area whose diameter is greater than the spacing of two opposite key surfaces 15. A continuous distribution space is therefore formed between the distribution channel 24 and the internal taper of the collet chuck, into which a coolant or lubricant supplied at the entry 18 [sic] of the adapter 1 can be guided through the radial passage openings 18. In an alternative embodiment, the key surfaces 15 can be dimensioned large enough so that surfaces adjacent in the peripheral direction overlap and a continuous reservoir distribution space is thus formed.

It is apparent in FIGS. 2 and 3 that one or more feed channels 26 sloped relative to the central axis 25 of the adapter 1 are provided to supply a coolant or other operating fluid to the tool fastened in the adapter 1. In the depicted practical example, three feed channels 26 distributed at equal angles in the peripheral direction are provided in the adapter 1. The feed channels 26 are arranged so that they lead from the key surface 15 provided with holes 18 or from the distribution channel 24 upward in the direction of the front face 8 of the receptacle body 1 facing the tool. The coolant or lubricant supplied at the entry 17 of adapter 1 can go via the passage openings 18 into the reservoir space 23 formed between the key surfaces 15 and the distribution channel 24 and the internal taper 21 of the chuck body 19 and from there to the tool via the feed channels 26.

All radial holes 18 and all feed channels 21 are connected to one another through the continuous distribution channel 24 on the outside periphery of the external taper 3. The number of holes 18 relative to the key surfaces 15 can therefore be arbitrary. Preferably every second key surface 15 is provided with a radial hole 18 and every key surface 15 lying in between is provided with a feed channel 26. In this way the receptacle body 1 of the adapter is least weakened.

In a particularly preferred embodiment, the feed channels 26 have an entry 27 arranged in the center and in the axial direction on the end of the key surfaces 15 on the tool side and an exit 28 on an annular surface 29 of the adapter 1 recessed relative to the face 8 on the tool side.

In another embodiment, there is no continuous reservoir or distribution channel. A radial hole 18 must then discharge on at least one key surface 15 and a feed channel 26 must begin.

Figure 4:
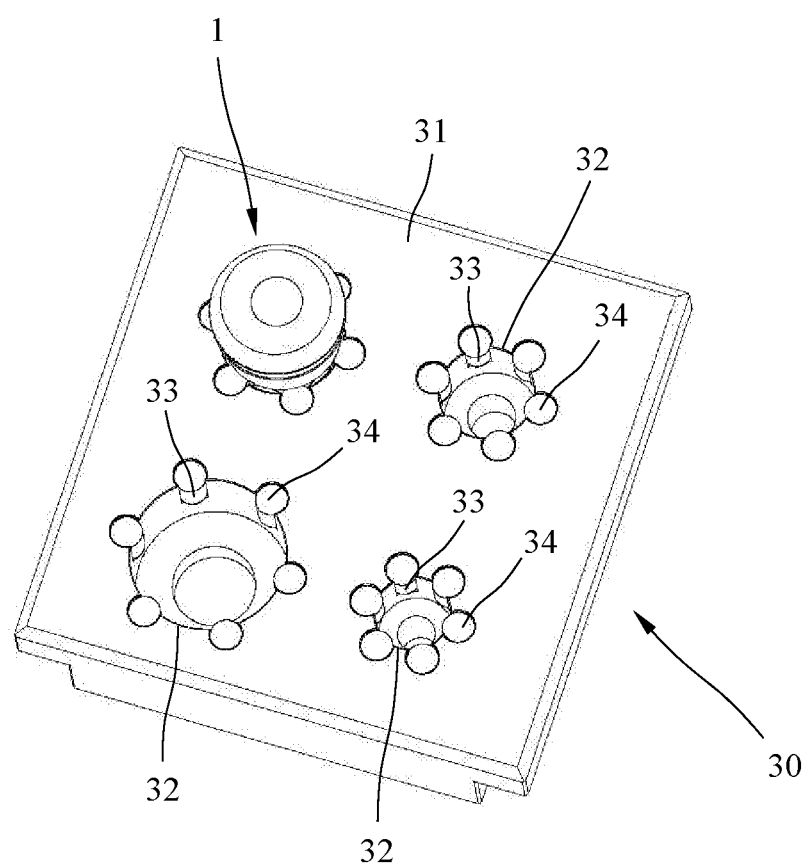
FIG. 4 shows a holding device for non-rotational holding of an adapter.

From mounting of a tool provided with a thread in the adapter 1 just described, the adapter 1 can be inserted into the holding device 30 depicted in FIG. 4. The holding device 30 has a plate-like carrier 31 with several openings 32 of different size for different adapters. Several holding surfaces 33 distributed over the periphery for shape-mated engagement with the shape-mated elements 14 designed as key surfaces 15 are provided on the inside of the openings 32. In the depicted embodiment, the holding surfaces 33 are arranged on several holding pins 34 uniformly distributed over the periphery of the openings 32. The holding surfaces 33 are arched inward on this account so that linear contact between the key surfaces 15 and the holding surfaces 33 is produced.

Figure 5:
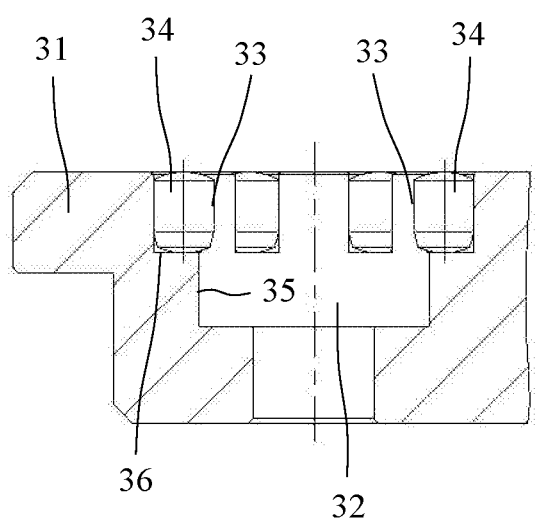
FIG. 5 shows a detailed sectional view of the holding device of FIG. 3.

As is apparent from FIG. 5, the holding pins 34 are arranged in the plate-like carrier 31 so that the holding surfaces 33 protrude inward relative to an inside wall 35 of opening 32. The holding pins 34 are inserted for this purpose into corresponding inward open holes 36.

Figure 6:
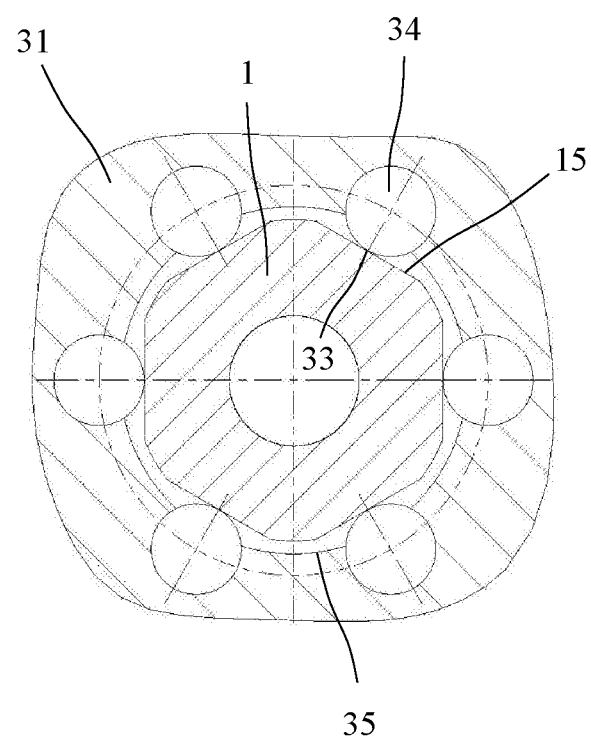
FIG. 6 shows a cross-section through a holding device with an adapter.

According to FIG. 6 the holding pins 34 are distributed over the periphery of the opening 32 so that the holding pins 34 with their holding surfaces 33 are arranged close to the center of the key surfaces 15 when the adapter 1 is inserted. For this purpose, the radial gap between the holding surfaces 33 and the key surfaces 15 should not be too large. In a preferred embodiment, the gap is less than 0.3 mm, preferably less than 0.15 mm, and even more preferably less than 0.1 mm. The loads on the adapter 1 can thus be kept as low as possible during screwing in of a tool, because the contact lines between the holding surfaces 33 and the key surfaces 15 are longest near the center of the key surfaces 15. With six key surfaces 15 distributed uniformly over the periphery, the holding pins 34 are each offset by 60° in the peripheral direction.

LIST OF REFERENCE NUMBERS

1 Adapter
2 Receptacle area
3 External taper
4 Insertion end
5 Conical outside surface
6 Receptacle opening
7 Internal thread
8 Face on tool side
9 First contact area
10 First contact surface
11 Second contact surface
12 Second contact area
13 Contact element
14 Shape-mated element
15 Key surface
16 Front end
17 Entry
18 Hole
19 Chuck body
20 Cap nut
21 Internal taper
22 Tool
23 Reservoir space
24 Distribution channel
25 Central axis
26 Feed channel
27 Entry
28 Exit
29 Annular surface
30 Holding device
31 Carrier
32 Opening
33 Holding surface
34 Holding pin
35 Inside wall
36 Hole

What is claimed is:

1. An adapter for holding a tool in a collet chuck, the adapter having an external taper to accommodate the adapter in the collet chuck, wherein the adapter has an internal thread for fastening of the tool, and a plurality of shape-mated elements for preventing rotation of the adapter during fastening of the tool arranged on an outer surface of the external taper, wherein the shape-mated elements are arranged at or near a midline of the external taper such that conical portions of the outer surface of the external taper run above and below the shape-mated elements for contact on a corresponding internal taper in a chuck body of the collet chuck.

2. The adapter of claim 1, wherein the shape-mated elements are designed as key surfaces distributed over the outer surface of the external taper.

3. The adapter of claim 2, wherein the key surfaces have a length of ⅕ to ⅓ the length of the external taper when viewed in an axial direction of the adapter.

4. The adapter of claim 2, wherein a radial passage opening is provided on at least one key surface that discharges into an entry on an insertion end of the external taper.

5. The adapter of claim 4, wherein at least one feed channel is arranged in the adapter for supplying a coolant or lubricant fed via entry in at least one passage opening to a face of the adapter on a tool side of the adapter.

6. The adapter of claim 5, wherein the at least one feed channel runs obliquely to a central axis of the adapter.

7. The adapter of claim 5, wherein the at least one feed channel contains an entry arranged on one of the key surfaces.

8. The adapter of claim 5, wherein the at least one feed channel has an exit on an annular surface of the adapter, the annular surface recessed relative to the face of the adapter on the tool side.

9. A holding device for preventing rotation of the adapter of claim 1, the holding device comprising a carrier having at least one opening and holding surfaces arranged on an inside of the opening designed for shape-mated engagement with the shape-mated elements of the adapter.

10. The holding device of claim 9, wherein the holding surfaces are arched inward.

11. The holding device of claim 9, wherein the holding surfaces are arranged on several holding pins distributed uniformly over a periphery of the opening.

12. The holding device of claim 11, wherein the holding pins are distributed over the periphery of the opening so that the holding pins are arranged in a center portion of the key surfaces when the adapter is inserted.

13. A combination of the adapter of claim 1 and a holding device for preventing rotation of the adapter, wherein the holding device comprises a carrier having at least one opening and holding surfaces arranged on an inside of the opening designed for shape-mated engagement with the shape-mated elements of the adapter.

14. The combination of claim 13, wherein a radial gap between the holding surfaces and the shape-mated elements is smaller than 0.3 mm.

15. The combination of claim 14, wherein the radial gap between the holding surfaces and the shape-mated element is smaller than 0.1 mm.

16. An adapter for holding a tool in a collet chuck, the adapter having an external taper to accommodate the adapter in the collet chuck, wherein the adapter has a thread for fastening of the tool, wherein a plurality of shape-mated elements for preventing rotation of the adapter during fastening of the tool is arranged on an outer surface of the external taper, wherein the shape-mated elements are arranged at or near a midline of the external taper such that conical portions of the outer surface of the external taper run above and below the shape-mated elements for contact on a corresponding internal taper in a chuck body of the collet chuck, wherein the shape-mated elements are designed as key surfaces distributed over the outer surface of the external taper, and wherein a distribution channel running at a level of the key surfaces is arranged on the outer surface of the external taper.

17. A combination of a collet chuck and an adapter for coupling a tool to the collet chuck, wherein
the collet chuck comprises a chuck body with an internal taper; and
the adapter comprises an external taper to accommodate the adapter in the collet chuck, an internal thread for fastening of the tool, and a plurality of shape-mated elements for preventing rotation of the adapter during fastening of the tool, the plurality of shape-mated elements radially spaced from the internal thread and arranged on an outer surface of the external taper with the shape-mated elements arranged at or near a midline of the external taper such that conical portions of the outer surface of the external taper run above and below the shape-mated elements for contact on the internal taper in the chuck body of the collet chuck.

18. The combination of claim 17, wherein the shape-mated elements delimit a reservoir space with the internal taper of the chuck body.

* * * * *